P. GORNY.
AUTOMOBILE SIGNALING DEVICE.
APPLICATION FILED JUNE 27, 1918. RENEWED NOV. 18, 1920.

1,366,317.

Patented Jan. 18, 1921.
2 SHEETS—SHEET 1.

Inventor
P. Gorny
By A. W. Wilson
Attorney

P. GORNY.
AUTOMOBILE SIGNALING DEVICE.
APPLICATION FILED JUNE 27, 1918. RENEWED NOV. 18, 1920.
1,366,317.
Patented Jan. 18, 1921.
2 SHEETS—SHEET 2.
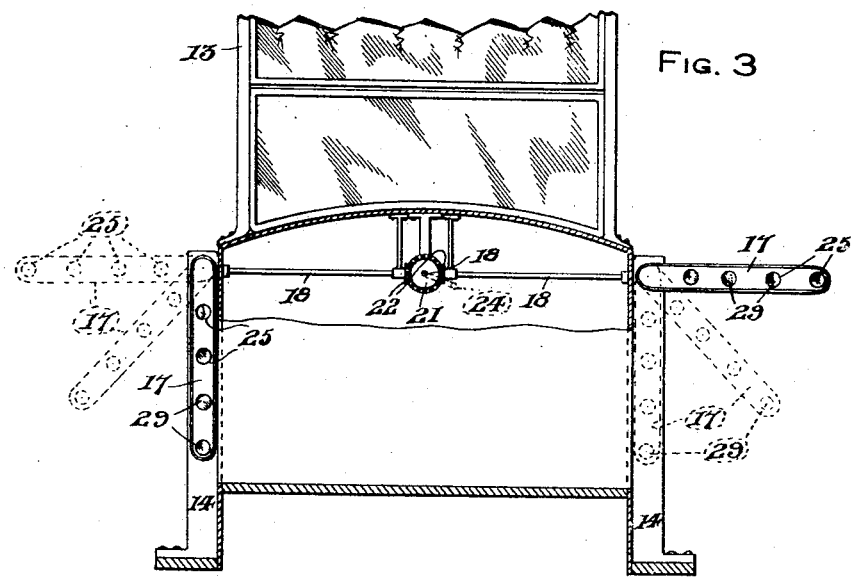
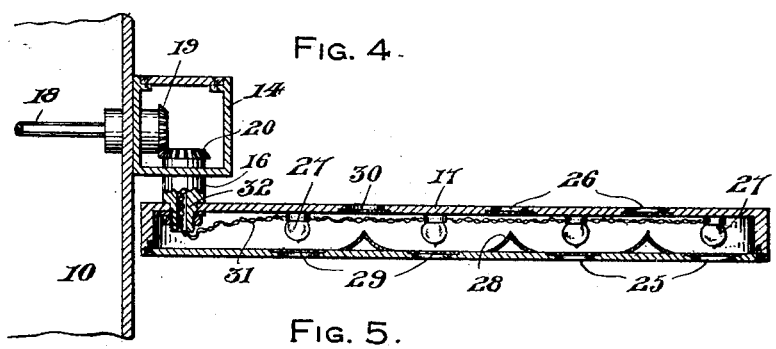
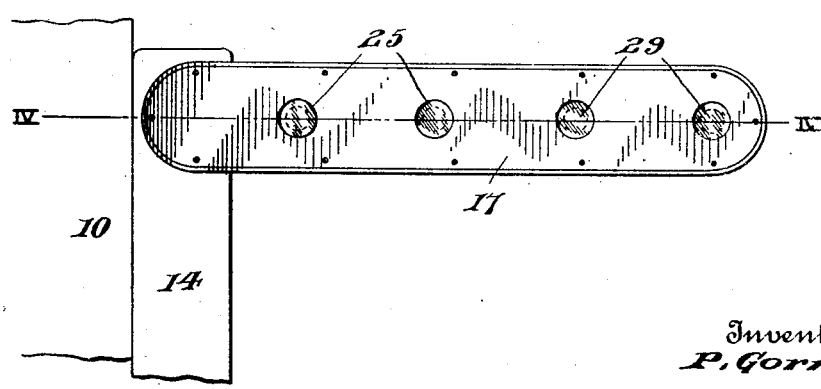

UNITED STATES PATENT OFFICE.

PIETR GÓRNY, OF EAST CHICAGO, INDIANA.

AUTOMOBILE SIGNALING DEVICE.

1,366,317. Specification of Letters Patent. Patented Jan. 18, 1921.

Application filed June 27, 1918, Serial No. 242,243. Renewed November 18, 1920. Serial No. 425,029.

*To all whom it may concern:*

Be it known that I, PIETR GÓRNY, a citizen of Russia, residing at East Chicago, in the county of Lake and State of Indiana, have invented certain new and useful Improvements in Automobile Signaling Devices, of which the following is a specification.

The primary object of the invention is the provision of an automobile signal adapted for ready adjustment by the driver of a vehicle for denoting to the public the intended future course of traveling of the automobile, the device being visible at night as well as the day time.

A further object of the invention is the provision of signals carried by a vehicle adapted for operation by the driver whereby a right or left hand turn is readily indicated for the advisement of persons either in advance or at the rear of the automobile, the device being operable by means of a single member conveniently located adjacent the driver's seat.

In the drawings forming a part of this application and in which like designating characters refer to the corresponding parts throughout the several views, Figure 1 is a side elevation of the forward portion of an automobile provided with my device;

Fig. 3 is a vertical transverse sectional view taken upon line III—III of Fig. 1;

Fig. 4 is a horizontal sectional view taken upon line IV—IV of Fig. 5 and showing the device upon an enlarged scale; and Fig. 5 is a front elevation of the same.

Figure 1:
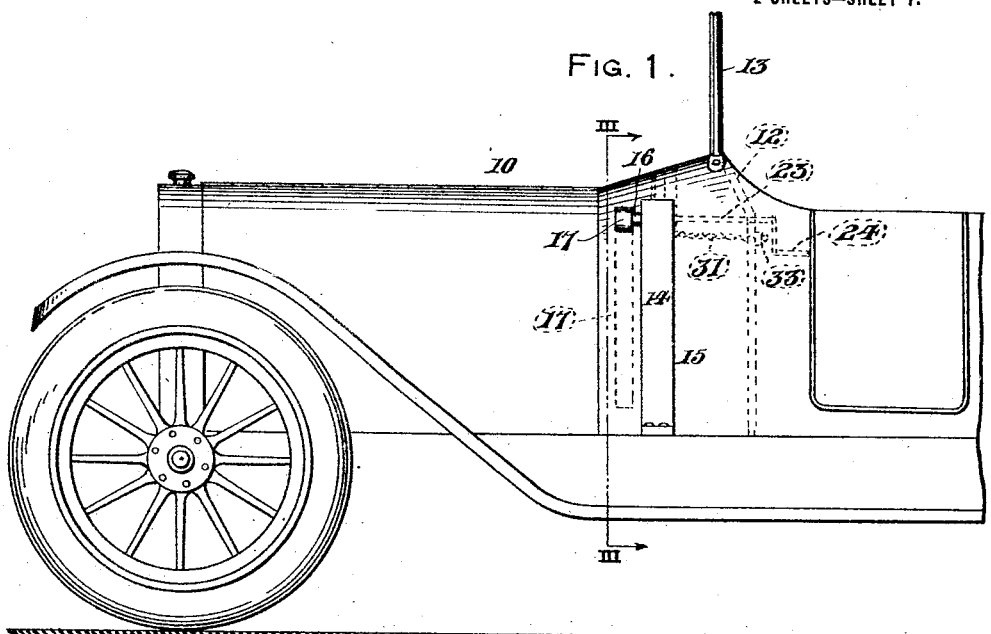

My signaling device is especially adapted for automobiles and is herein illustrated in connection with the automobile 10 having a driver's seat 11 with a dash board 12 and a wind shield 13 positioned forwardly of the said seat. A tubular post 14 is vertically positioned at each side of the automobile secured exteriorly of the body 15 thereof in any convenient manner. A hub 16 is journaled through the forward side of each of the posts 14 adjacent its upper end and has a hollow signal arm 17 in the form of a casing secured thereto which turns with the said hub 16.

Oppositely extending shafts 18 are journaled within the body 15 with their outer ends projecting in the posts 14 and each provided with a gear 19 within one of the posts and which gear is in constant mesh with a similar gear 20 upon the adjacently positioned hub 16. A pinion 21 is provided in constant mesh with relatively smaller pinions 22 secured upon the inner spaced ends of the rods 18 while a crank shaft 23 is attached to the pinion 21 having an operating handle 24 positioned adjacent the dash board 12 forwardly of the driver's seat 11.

Figure 2:
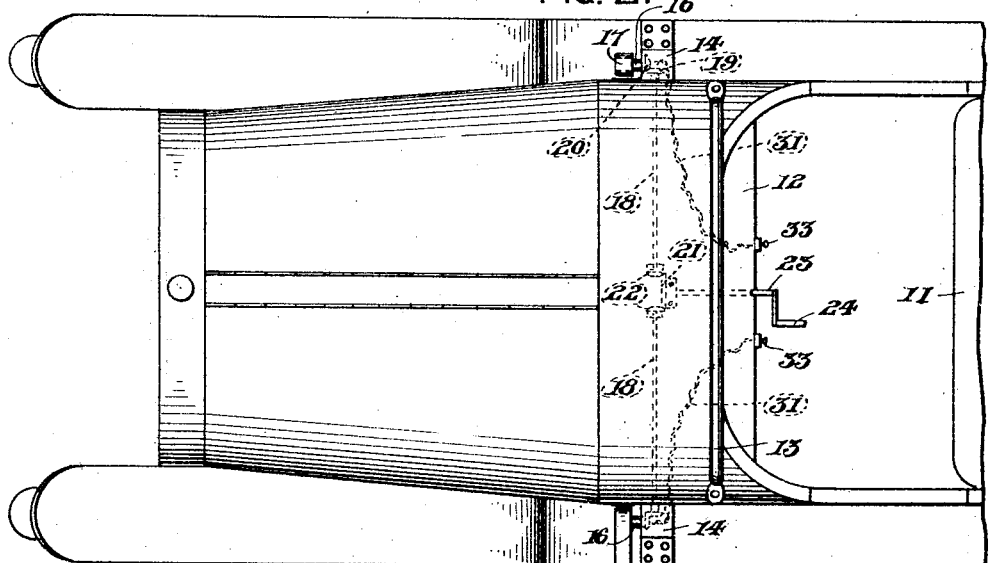
Fig. 2 is a top plan view thereof.

When the arms 17 are in their normal positions, the said arms are downwardly inclined at opposite sides of the body 15 as indicated by dotted lines in Fig. 3 of the drawings and denoting the intended forward travel of the automobile. When the vehicle is to take a left hand turn, the handle 24 of the crank 23 is turned upwardly toward the right which will elevate the left hand arm 17 to a horizontal position and will lower the right hand arm to a vertical position adjacent the side of the vehicle body 15. Such positions of the opposite arm 17 are illustrated in Figs. 1, 2 and 3 of the drawings and at which times the public is advised that the vehicle is about to be steered toward the left in making a left hand turn. Upon reversing the direction of rotation of the crank handle 24 and shaft 23, the arms 17 are returned to their normal oblique positions or by a continuation of such turning movement the right hand arm 17 will be elevated horizontally while the left hand arm will be simultaneously dropped to its vertical inoperative position. The public, rearwardly as well as forwardly of the automobile 10, will be accurately advised in this manner of the future intended course of travel of the vehicle, it being understood that the driver upon the seat 11 may readily grasp the crank handle 24 for adjusting the arms 17 to the desired positions, while this form of gearing connections between the arms 17 and crank shaft 23 is adapted to retain the arms adjusted until the same are again manually shifted simultaneously to different positions.

Openings 25 are provided in the forward side of each arm 17 while similar openings 26 which are out of alinement with the openings 25 are provided in the rear side of each arm. Electric lamps 27 are mounted within the arms 17 between the openings 26 and are preferably provided with conical reflectors 28 arranged within the arms opposite the openings 26. Pieces or plates of glass 29 may be provided in the openings 25, while similar glasses 30 preferably colored red, are provided in the openings 26.

The lamps 27 are supplied with electric current by means of wires 31 connected between the lamps 27 and passing through the bore 32 of the adjacent hub 16 to any suitable source of electrical supply, not shown, the said wires from each of the arms 17, terminating in a suitable switch 33 mounted upon the dash board 16 at opposite sides of the crank shaft 23. The lamps 27 are lighted at night by closing the switches 33 so that the position of the arm 17 is readily noted by the public. Persons in the rear of the automobile 10 will see the illuminated red glasses 30 of the openings 26, while persons forwardly of the vehicle will see the plain glasses 25, but in either event the arm will be readily viewable in the night time so that the intended future course of the vehicle may be readily noted. The switches 33 will be opened in the day time as the lamps 27 will not then be required.

What I claim as new is:—

An automobile signal comprising a pair of vertical hollow posts designed to be mounted on each side of an automobile body forwardly of the dashboard, a pair of oppositely extending shafts mounted on and extending through said body and each having one end terminating in said post, a gear secured to the end of each of the shafts, which are located in the post, a hub journaled in each post near the upper end thereof and having a vertically swinging arm attached thereto, a gear on each hub and constantly in mesh with the gears on the respective ends of said shafts, and an operating means journaled centrally through the dashboard of the body and operatively connected at the inner free ends of said shafts whereby said arms may be raised to a horizontal signaling position.

In testimony whereof I affix my signature.

PIETR GÓRNY.